Figure 1:
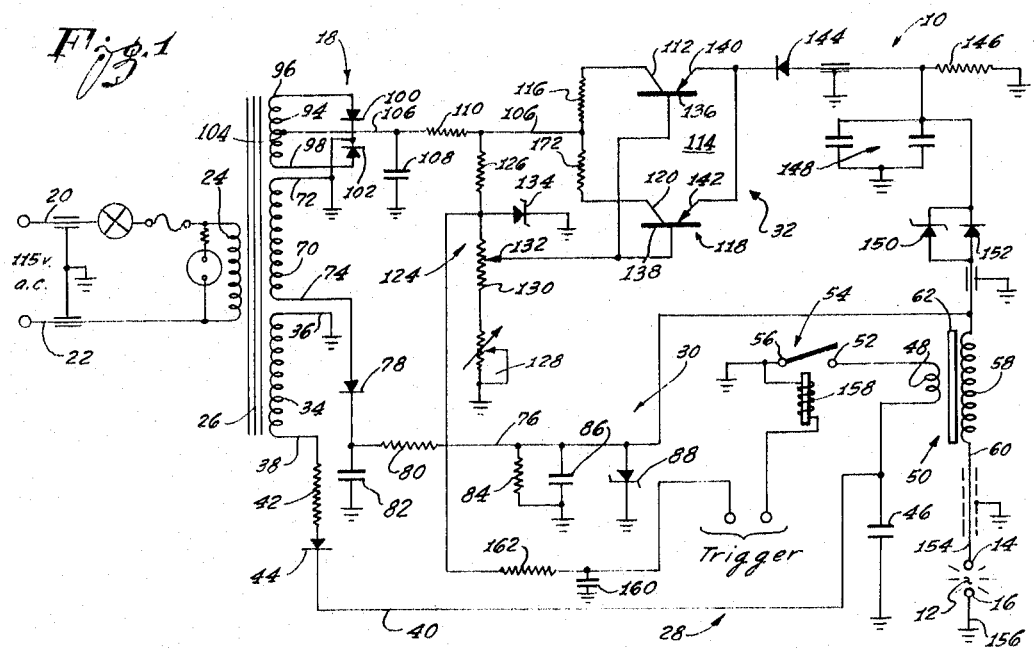

May 31, 1966  D. L. PHILLIPS  3,254,194

WELDER

Original Filed Sept. 27, 1961

INVENTOR
Delbert L. Phillips

Attorneys

United States Patent Office 3,254,194
Patented May 31, 1966

3,254,194
WELDER
Delbert L. Phillips, Malibu, Calif., assignor to Pulse Arc Welder Company, Santa Monica, Calif., a corporation of California
Continuation of abandoned application Ser. No. 141,060, Sept. 27, 1961. This application Feb. 19, 1963, Ser. No. 259,688
13 Claims. (Cl. 219—95)

The present invention relates to welding means and, more particularly, to arc welding means adapted to provide very accurately controlled amounts of energy to the arc.

This is a continuation of copending application Serial No. 141,060, filed Sept. 27, 1961, by Delbert L. Phillips for welder, now abandoned.

It is very frequently desirable to be able to weld a pair of workpieces such as a pair of small wires together in an end-to-end relation by means of a butt weld or to weld the ends of a group of wires together by a single weld or to weld a pair of workpieces such as thin sheets together by a weld or series of welds along the adjacent edges. One form of welder that has been available heretofore for welding a pair of workpieces together is the so-called resistance welder. In this form of welder, the two workpieces are placed in a pair of clamps. These clamps electrically connect the workpieces into the welder circuit and also retain the workpieces positioned in the desired relationship. The welder may then be energized to cause a surge of welding current to flow between the clamps and the workpieces and across the resistance formed at the junction between the two workpieces. The flow of welding current through the resistance at the junction of the workpieces will generate sufficient heat to melt and weld the two workpieces together. The same welding current that flows through the junction of the workpieces also flows through the clamps holding them together. As a consequence, a substantial amount of the weld energy is dissipated in the resistances where the clamps engage the workpieces. The amount of energy that is lost in this manner is large compared to the amount of energy dissipated in the weld and it therefore materially reduces the efficiency of the welder. Also, the amount of this loss is not consistent, but is of a somewhat variable and random nature. As a consequence, it greatly interferes with the accuracy of the weld. As the size of the workpieces decreases, the magnitude of the losses become larger in relation to the weld energy and, therefore, the degree of inaccuracy increases as the size of the workpieces decreases. To produce consistent resistance welds, it is necessary for the resistance of the junction between the workpieces to be constant between the successive welds. This requires that the contacting surfaces of the workpieces be cleaned and/or shaped to insure the correct intimate engagement therebetween. This results in a time consuming and expensive operation. Since the workpieces are in intimate engagement prior to, during and after the flow of the welding current, it is very difficult, if not impossible, to very precisely control the amount of energy that is dissipated in the weld. Numerous attempts have been made to devise resistance welders having means for controlling the welding current. However, because of the inherently very low resistances and voltages, the magnitudes of the welding currents are extremely high. This has heretofore resulted in employing very heavy duty and cumbersome switching equipment that is unreliable in operation and subject to rapid wearing. As a consequence, the use of resistance welders as a practical matter has been limited to welding sheet materials of substantial thicknesses together. Although satisfactory welds can be made on such materials, the weld is inherently concealed between the members and is not readily available for visual inspection. Also, the size of the weld is determined by the size of the clamp members and cannot be readily varied. Resistance welders have not been suitable for welding small members such as wires in an end-to-end or butt weld.

Another form of welder that has been available heretofore for welding a pair of workpieces together is the so-called impact welder. In this form of welder, the workpieces are initially separated by a substantial air gap. The welder is then energized as the two workpieces are brought together at a rapid rate and with a very substantial force. At the time of initial impact or in some instances slightly therebefore, an arc is struck between the two workpieces so as to heat the adjacent surfaces to a sufficient degree to cause the members to be forged or welded as a result of the impact. In such a welder, the operation of the entire welder must be synchronized with the motion of the two workpieces as they approach each other. This restricts the welding cycle to one that is compatible with the motion of the impacting of the members rather than one that produces the optimum weld. More particularly, the welding cycle must be started in response to the workpieces moving together and the size of the gap and the flow of current cannot be controlled independently. Although numerous efforts have been made to solve this problem, it has been necessary in impact welders to employ elaborate electrical circuits for switching the welding current "ON" and "OFF" in the required synchronism with the impacting of the members. As a consequence, the use of impact welders has been confined to the welding of relatively large members such as studs, etc., to a heavy plate. Such welders are not practical for welding sheets together and the resultant welds would have the same defects as the resistance welds. Furthermore, the number of workpieces welded in any given period of time is relatively low in view of the requirement that movements of pairs of workpieces are required.

It is very frequently desirable to heat the end or edge of a member sufficiently to cause only a predetermined amount of the metal in the member to melt. This melted metal may then be permitted to form into a smooth rounded surface as it cools. When a single member such as a wire is treated in this manner, the resultant end will be suitable for being used as a connector. When a group of wires have their ends all simultaneously heated in this manner, they will be welded into a single structure having an increased thickness relative to the individual wires and having a smooth round end suitable for use as a connector. When the edges of a pair of members such as juxtaposed sheets are heated in this manner, the melted metal will form a weld that will secure the sheets together by a clearly visible weld. When the adjacent ends of a pair of aligned wires or the end of a wire and a metallic sheet are heated in this manner, they may be joined so as to be welded together by the solidifying metal. One means for accomplishing this objective is to use one or more of the members as an electrode and discharge an electrical arc therebetween that will heat the surfaces of the members. The amount of energy in the arc must be very accurately controlled, particularly when at least one one of the electrodes is a small member such as a wire.

Resistance welders are incapable of producing arc discharges and are, therefore, not capable of being used for these purposes. Impact welders are not capable of producing the required heating and/or positioning of the workpieces. Heretofore, it has been extremely difficult, if not impossible, to consistently discharge an electrical arc having the required amount of energy therein and controlled within sufficiently close limits in order to insure a consistently uniform heating of the electrodes. This is particularly true where it has been necessary to maintain a space between the electrodes when the arc is initially struck, during the arcing period and thereafter. Accordingly, heretofore it has not been possible to consistently provide an accurate weld and/or heating of very small objects such as wires, etc., particularly on a mass production basis wherein it is desired to treat a large number of members at a high rate of speed.

It is now proposed to provide welding means that will overcome the foregoing difficulties. More particularly, it is proposed to provide welding means that include a control circuit that will be capable of accurately starting and stopping an arc between a pair of spaced apart electrodes and to accurately control the amount of energy discharged through the arc. This is to be accomplished by providing welding means having a control circuit therein that includes means for igniting or striking between a pair of electrodes or workpieces an arc having a high voltage and low energy level and means for continuing the arc at a lower voltage and higher energy levels for supplying an exact amount of energy to the arc. If desired, additional means may be provided to produce an intermediate arc having an intermediate voltage and an intermediate energy level.

The igniting or striking means is effective upon actuation of the welder to very rapidly generate a very high frequency voltage pulse across an air gap. This pulse produces an arc at a low level of energy between the electrodes. If the intermediate means are included, it will discharge an intermediate arc that is a continuation of the striking arc. This arc will contain only a sufficient amount of energy to heat the ionized path, thereby increasing the conductivity of the path sufficiently to insure maintaining the arc and also shorten the length of the ionized path and center it between the adjacent ends of the electrodes or workpieces. In addition, the resultant temperature and the voltage will be high enough to "burn" oxides, scale, etc., from the surface of the electrode to thereby clean the surface and to consume any oxygen present in the atmosphere in and around the air gap. The remaining means may include a source of energy such as a bank of condensers that will be effective to store an exact amount of energy and will be effective to discharge this energy at a high rate across the arc. This accurately controlled discharge of energy at a high rate will thus provide an accurate heating of the electrodes.

The various means described in the previous paragraph are interconnected so that their operation is initiated by the closing of a single set of contacts on a single switch. These contacts are not required to switch the heavy welding currents and accordingly are long lasting and reliable. Upon the closing of the contacts, the first means strikes the arc and all of the succeeding means are responsive to the arc. As a consequence, the switch is isolated from the actual weld producing portion of the circuit and once a welding cycle is initiated, the entire cycle will progress to its completion without the necessity of a series of switching means operating in some precisely controlled sequence. It may thus be seen that the discharging of the energy may be accomplished totally independently of any motion of the workpieces. As a consequence, the amount and rate of the energy discharged may be matched to the materials that are being welded to produce a weld of the desired size. Also, the time duration of the discharge may be varied to insure the optimum weld.

Figure 2:
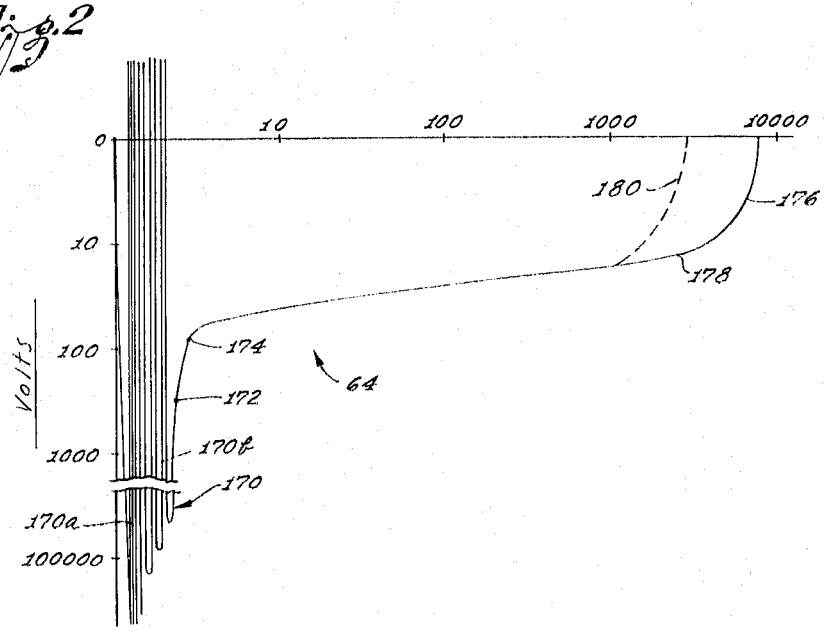

These and other features and advantages of the present invention will become readily apparent from the following detailed description of one embodiment of the present invention particularly when read in connection with the drawings wherein like reference numerals refer to like parts and wherein:

FIGURE 1 is a diagram of a welding means and a control circuit thereon which embody the present invention; and FIGURE 2 is a graph, with a logarithmetic scaling of both the abscissa and of the ordinate, of the voltage present across the arc at the time of the discharge of the arc.

Referring to the drawings in more detail, the present invention is particularly adapted to be embodied in a welder 10 for producing an arc 12 that extends across the space between two electrodes 14 and 16. The electrodes may comprise at least one member such as member 16 that has a surface thereon which it is desired to heat to some predetermined amount such as when it is intended to secure the member 16 to member 14 or as when it is intended to merely heat the surface of member 14 or 16 to produce some predetermined thermal effect thereon. For example, it may be desirable to employ a single arc discharge to heat a small portion on the end of a member such as a small wire or the adjacent ends of a groups of wires to the melting point and to then allow the melted portion to coalesce into a smooth rounded end surface. Thus, the wire or the group of wires will have a smooth end surface suitable for use as a connector that may be inserted into a connector receptacle. Alternatively, it may be desirable for one of the electrodes to comprise a pair of members such as two thin sheets that have their edges disposed immediately adjacent each other. A single arc discharge may then be produced on a small portion of these edges to heat them sufficiently to form a small molten portion that will coalesce and form a small weld that joins the members together. Alternatively, it may be desirable for the electrodes 14 and 16 to comprise a pair of small members such as a pair of wires that it is desired to join together in an end-to-end butt weld. A single arc discharge between the wires will melt small portions on the ends of these wires to the melting point. The wire members may then be joined together to allow the molten metal to coalesce and form a butt weld between the wires. The present welder 10 is especially useful for such purposes since it is capable of supplying very accurately controlled amounts of energy to the electrodes 14 ad 16.

The present welder 10 includes a control circuit which has an input section that has a pair of conductors 20 and 22 that are adapted to be interconnected with a power supply line such as a 115 volt power line. The conductors 20 and 22 may also be connected to the opposite sides of a primary winding 24 of an iron core transformer 26. The control circuit also includes a striking portion 28, a cleaning and centering portion 30 and a welding portion 32. The striking portion 28 includes a secondary winding 34 that is disposed on the core of the transformer 26 so as to be coupled to the primary winding 24. The turns ratio between the primary winding 24 and the secondary winding 34 is preferably suitable to cause the voltage developed across the secondary winding 34 to be stepped up to a level of roughly 2,000 to 3,000 volts.

One side of the secondary winding 34 is connected directly to ground while the opposite side 38 of the winding 34 is connected to a high voltage supply line 40. This supply line 40 includes a dropping or load limiting resistor 42 and a rectifying diode 44. The opposite end of the supply line 40 leads to one side of an energy storing condenser 46. The opposite side of the condenser 46 is connected directly to ground. It may thus be seen that although the secondary winding 34 will supply an A.C. voltage, the diode 44 will rectify the voltage and will permit the condenser 46 to accumulate a static charge thereon. Although the resistor 42 may be effective to limit the charging rate of the condenser 46, the period thereof will be very short and the charge will rapidly build up to an amount where the voltage across the condenser 46 will be substantially equal to the voltage across the secondary winding 34.

The condenser 46 is also connected to one side of a primary winding 48 in a second transformer 50. The opposite side of the primary winding 48 is connected to one of the contacts 52 in a normally open relay switch 54.

The contact 56 on the opposite side of the switch 54 may be connected directly to ground.

As a consequence, it may be seen that the primary winding 48 and the switch 54 form a circuit for discharging the condenser 46. When the switch contacts 52 and 56 are open, the voltage developed on the secondary winding 34 will be impressed across the condenser 46 and the condenser 46 will accumulate a static charge thereon having a voltage equal to that of the secondary winding 34. However, when the switch contacts 52 and 56 close, the condenser 46 will be permitted to discharge through the primary winding 48 to ground. The primary winding 48 preferably has a relatively small number of turns and a very low impedance. As a result, the entire charge on the condenser 46 will be dissipated in an extremely short time interval. By way of example, it has been found desirable for this time interval for discharge to be roughly on the order of about a microsecond or less. It may therefore be seen that the discharge of condenser 46 will produce a high voltage, high frequency pulse. It should be noted that although the closing of the contacts 52 and 56 will be effective to connect the high voltage line 40 to ground, the limiting resistor 42 will be effective to prevent a complete short circuiting of the secondary winding 34. Therefore, the secondary winding 34 and diode 44 will be protected against burnout.

The transformer 50 includes a secondary winding 58 which has the first side 60 thereof interconnected with one of the electrodes 14. In order to provide an adequate degree of coupling between the primary and secondary windings 48 and 58, it has been found desirable to employ a core 62 consisting of a suitable magnetic material. Since it is desirable to maintain the discharge pulse from the condenser in the megacycle range, the transformer 50 should be of the high frequency variety. Accordingly, the core member should consist of a material that will not produce excessive energy losses at the high frequencies. It is also desirable to employ a ferrite having a very small amount of residual magnetism whereby the core will have very little, if any, residual or permanent magnetism left in it after a welding cycle. It is also desirable to employ a ferrite having a low saturation such that it will saturate very rapidly when the primary 48 or secondary 58 are energized. When the core saturates the impedances of the windings and the coupling therebetween will decrease. There are a large number of ferrite materials that are well suited for this use, by way of example, it has been found that Ferroxcube 104 manufactured by the Ferroxcube Co. is particularly well adapted for this use.

The turns ratio between the primary and secondary windings is preferably of sufficient magnitude to step up the voltage to a high enough amount to cause the voltage developed across the arc to be roughly on the order of 20,000 to 100,000 volts. This voltage which must be adequate to insure a consistent striking of an arc across the space between the electrodes 14 and 16 may be empirically determined by experimentation and will be determined largely by the space between the electrodes.

The condenser 46 will have a static charge thereon with a potential that will be substantially equal to the peak voltage produced across the secondary 34. When the contacts 52 and 56 are closed, the condenser 46 and the winding 48 will be directly connected to each other and they will now form a tank circuit with little, if any, resistance and a high resonant frequency. This circuit may have a resonant frequency that will be effective to produce fundamental or harmonic oscillations in all or only part of the circuit that is in the megacycle or even gigacycle range.

The charge stored in the condenser 46 and its full potential will be placed directly across the entire winding 48. The tank circuit will thus contain all of the energy required for oscillating at the instant it is formed. This will eliminate any delay in building up its oscillation resulting from having to feed energy into the tank circuit as has been required heretofore. As a result, the charge will instantly flow through the winding 48 and the oscillations that will be created in the tank circuit will instantly be at their peak value. By providing a very rapid discharge of the condenser through the winding 48 and effectively initiating the oscillations at their peak value, a pulse at a very high frequency and a high voltage will be created between the electrodes 14 and 16 within a quarter of a cycle of the high frequency. It should be noted that because of the direct connection of the condenser 46 to the winding 48, the resultant tank circuit will have very little resistance. As a result, the ratio of reactance to resistance or the so-called "Q" will be extremely high. Thus, very little energy will be dissipated or wasted in the tank circuit and the voltage that will be built up in the secondary 58 and across the gap 12 will be extremely high. In fact, because of the high "Q"' resonant effect, this voltage built up in the secondary 58 and across the gap 12 will exceed the step-up ratio between the windings 48 and 58 by as much as four or more times.

It may thus be seen that when the contacts 52 and 56 close, the condenser 46 will very rapidly discharge through the primary winding 48 and produce a high frequency, high voltage pulse between the electrodes 14 and 16. As may be seen from FIGURE 2, the voltage 64 across the electrodes 14 and 16 will very rapidly rise to a high level. Although the energy stored in the condenser 46 may be relatively small, the presence of the high voltage, high frequency potential will be effective to almost instantly create a path of ionized air between the two electrodes 14 and 16. As a result thereof, this voltage pulse will strike and ignite an arc 12 between the two electrodes 14 and 16.

It should be noted that as soon as the condenser 46 has completed its discharge and the arc has been struck across the gap 12, the contribution of the striking portion 28 has been completed and it will have little, if any, further effect on the operation during the remainder of the welder circuit. As a consequence, the switch 54 may have its contacts 52 and 56 closed for an extremely short interval whereby the condenser 46 may commence recharging instantly so as to permit a rapid recycling of the welder.

It has been found that a high frequency, high voltage pulse with little energy thereon will normaly follow a random path. As a consequence, an arc 12 struck in the foregoing manner will not necessarily be of the shortest possible length nor will it necessarily extend between the ends of the electrodes 14 and 16. Accordingly, the centering and cleaning portion 30 may be included in the control circuit. This portion 30 includes a secondary winding 70 that is coupled to the primary winding 24 of the transformer 26. One side 72 of the winding 70 is grounded while the opposite side 74 is connected to a supply line 76. The turns ratio of the primary 24 and secondary 70 is such as to provide a voltage roughly on the order of 350 to 400 volts across the secondary.

The supply line 76 extends from the side 74 to the second end of the secondary winding 58 of the transformer 50 and it includes a rectifying diode 78 and a load limiting resistor 80. The supply line 76 may have a condenser 82 connected thereto between the diode 78 and resistor 80 so as to extend to ground. In addition, the line 76 may also have a resistor 84, a condenser 86 and a Zener diode 88 connected thereto s oas to extend to ground. The diode 78 will rectify the voltage from the winding 70 and thus cause the condenser 86 to accumulate a static charge thereon. The combination of the resistor 80 and the Zener diode 88 will insure the voltage across the condenser 86 being accurately controlled at a predetermined amount. The potential of the charge on the condenser 86 will be approximately equal to the maximum or peak voltage across the winding 70.

It may thus be seen that as soon as the striking portion 28 ignites or strikes an arc whereby an electrically conductive path is formed between the electrodes, the charge on the condenser 86 may flow therethrough. Although the voltage of this charge will be initially on the order of 350 to 400 volts which is too low to strike an arc, it will have an adequate potential to maintain such an arc once it is established. Also the amount of energy stored in the condenser 86 will be adequate to immediately heat and ionize an increased amount of air. This will not only insure the continued existence of the arc 12, but will cause the arc to be concentrated into a path that extends between the desired portions of the end surfaces of the members 14 and 16. In addition, the amount of energy and potential will be effective to burn oxide, films, etc. from the end surfaces so as to clean them. The time constant of the discharge circuit which includes the arc 12 and secondary winding 58 is preferably so short as to permit the condenser 86 to discharge in an interval on the order of one or two microseconds. Thus, as may be seen from the graph of FIGURE 2, the voltage 64 will fall from a level of a few hundred volts at time 172 to about 20 or 30 volts at time 174 a few microseconds later.

Since the condenser 86 is always connected directly to the line 76, the line 76 will be maintained at the potential of the charge. This potential will also be present through the winding 58 and across air gap 12. As previously stated, the air gap will normally be non-conductive and the charge will have too low a potential to cause the gap 12 to break down. As a consequence, the charge on the condenser 86 will normally be prevented from discharging into or across the gap 12. However, as soon as an arc is struck across the air gap 12, the gap will become conductive to form a discharge path for the charge on the condenser 86. Thus, as the initial arc progresses and the voltage across the gap 12 falls to the potential on the condenser 86, the condenser 86 can instantly proceed to discharge. This insures that the timing of the discharge from the condenser 86 will be inherently timed as an automatic characteristic of the circuit and it is not necessary to provide any switches which must be synchronized to operate at precisely timed intervals.

The welding portion 32 includes a secondary winding 94 that is coupled to the primary winding 24 in the transformer 26. The opposite ends 96 and 98 of the winding 94 are connected together by a pair of diodes 100 and 102 that have the junction therebetween grounded. A center tap 104 on the winding 94 is connected to a D.C. power supply line 106. The number of turns in the secondary winding is such as to provide on the order of 100 volts between the ends 96 and 98 or roughly 50 volts between the supply line 106 and ground. A filter condenser 108 may be provided to insure a more ripple-free D.C. voltage. In addition, the line 106 may include a voltage dropping resistor 110. The supply line 106 may be connected to the collector 112 of a transistor 114 by means of a resistor 116. Where it is desired to increase the capacity and/or decrease the load on the transistor 114, a second transistor 118 may be connected in parallel so that the collector 120 thereof will be connected to the line 106 by a resistor 172.

In addition, the supply line 106 may be connected to a voltage dividing network 124 that includes a fixed resistor 126, a trimmer resistor 128 and a variable potentiometer 130 with a movable tap 132. A Zener diode 134 is connected from the junction between the resistors 126 and the potentiometer to ground to thereby maintain a constant controlled voltage at the terminal of the potentiometer 130.

It may thus be seen that the tap 132 will provide an adjustable and accurately controlled voltage. This tap 132 is, in turn, respectively connected to the bases 136 and 138 of the transistors 114 and 118 to thereby provide an adjustable bias voltage thereacross. The emitters 140 and 142 of the transistors 114 and 118 are, in turn, connected to a diode 144 that leads to a resistor 146 that is grounded.

A condenser bank 148 may be connected to the junction between the plate of the diode 144 and the resistor 146. The opposite side of the bank 148 may be connected to ground. The bank 148 of the condensers may also be connected to the upper end of the secondary 58 by means of a Zener diode 150 and an isolating diode 152. It may thus be seen that the condenser bank 148 will be effective to impose a voltage across the electrodes 14 and 16. This voltage is preferably adequate to maintain the arc 12 once it has been established by the portions 28 and 30. Thus, the energy stored in the condenser bank 148 will be discharged in the arc. Since the voltage across the condenser bank 148 may be controlled by the setting of the potentiometer center tap 132, it will be apparent that the amount of energy disipated in the arc may be controlled to suit the application to which the welder is being put at the time.

The condenser bank 148 may be connected to the upper end of the winding 58 so as to apply the potential of the bank across the winding 58. This potential may be on the order of 50 volts or less and will be too low to strike an arc. Since the gap is normally non-conductive, the charge may be maintained on the condenser bank 148 indefinitely. However, as soon as the arc has been struck and the condenser has discharged such that the voltage at the upper end of the winding 58 has dropped to the potential of the condenser bank 148, the energy in the bank will automatically commence to discharge through the air gap 12. This action will be similar to the action of the condenser 86. That is, it will inherently insure the commencement of the discharge occurring automatically at the very precise time that is required. It will not be necessary to endeavor to provide switch means for synchronizing the discharges. Also, it will not be necessary to endeavor to obtain a switch capable of switching the heavy welding currents "ON" or "OFF."

In order to employ the present welder 10 for welding two members 14 and 16 together, the two members are operatively interconnected with the leads 154 and 156 to thereby permit the members to act as electrodes. Alternatively, if the welder 10 is to be employed for applying a predetermined amount of heat to the end of one member such as 16, the member 16 is connected to one of the leads 154 or 156 so as to form one of the electrodes. The two electrodes are then positioned adjacent each other so that a predetermined amount of space will be provided therebetween.

The contacts 52 and 56 of the switch 54 are then closed. Although the switch 54 may be of any suitable variety, in the present instance, it is a high speed relay having a coil 158. This coil 158 has one side grounded with the other side being connected to a trigger mechanism. The trigger mechanism is interconnected with a condenser 160 that is connected to a resistor 162 leading to the voltage divider 124. When the trigger mechanism is actuated, either manually or automatically, the condenser 160 will discharge through the coil 158 and cause the contacts 52 and 56 the close. Since the resistance of the coil 158 is small, the condenser 160 will discharge very rapidly through the coil 158. As soon as the condenser 160 has discharged, the resistor 162 will limit the current flow to such a small amount that the coil 158 will be incapable of holding the contacts 52 and 56 closed. As a result, the contacts 52 and 56 will then open after being closed on the order of a few milliseconds. Although the trigger mechanism keeps the coil 158 energized, it will never be able to close the contacts 52 and 56 again until the trigger mechanism is opened so as to permit the condenser 160 to again accumulate a new charge.

As soon as the contacts 52 and 56 close, the static charge accumulated upon the condenser 46 will be free to discharge through the primary winding 48 of the transformer 50, the contacts 52 and 56 and thence to ground. This pulse will cause a stepped up voltage in the secondary winding 58 that will produce a voltage 64 across the electrodes 14 and 16. Complete discharge of the condenser 46 preferably occurs in a very short time interval. By way of example, as may be seen from FIGURE 2, the voltage 64 rises to a peak value in a very short interval such as a half of a microsecond. It should be noted that although the contacts 52 and 56 may close and open very rapidly, this pulse 170 will occur much faster. Thus, the opening of the contacts 52 and 56 will not interfere with the discharge of the condenser 46. Moreover, even though the closing of the contacts 52 and 56 also connects the secondary winding 34 directly to ground, the resistor 42 has an adequate resistance to limit the current to protect the secondary winding 34, diode 44 and contacts 52 and 56 to prevent burning thereof.

The secondary winding 58 will develop a pulse similar to the discharge pulse through winding 48, but with a voltage that is stepped up by an amount that is a function of the turns ratio between the primary 48 and secondary 58. The turns ratio may be chosen so as to produce a voltage pulse 170 of sufficient magnitude to insure an arc being consistently struck across the space normally present between the electrodes 14 and 16. Also, because of the small amount of resistance present in the tank circuit formed by the condenser 46 and the winding 48, the build up of voltage in the secondary will be increased by an amount that is some multiple of the turns ratio. By way of example, this voltage may be on the order of approximately 20,000 up to 100,000 or even higher.

As a result of tests that have been made on one operative embodiment of the present invention, it is believed that the pulse 170 has a first high frequency component 170a that is followed by a second components 170b. The first component 170a apparently reaches its peak value within about one-half microsecond and persists for about a few hundredths of a microsecond and has a frequency that is believed to be on the order of a kilomegacycle. The second components 170b is a continuation of the first pulse 170a and it is believed to persist for about 1 or 2 microseconds and have a frequency in the general range of 165 megacycles. This frequency is apparently a function of the resonant frequency of the winding 48.

The pulse 170 and particularly the component 170a will be effective to ionize the air between the electrodes and form an electrically conductive path therebetween. As a result, the energy in the discharge pulse will be dissipated primarily in the arc. Any high frequency "spike" that endeavors to travel in the reverse direction will be absorbed by the inherent capacity around the several leads and/or will be blocked by the diodes 88, 150 and 152 so as to prevent the high frequency energy producing ringing of the portions 30 and 32 of the circuit or otherwise interfering with the operation of or damage to those or other portions of the circuit.

Once the voltage between the electrodes 14 and 16 has risen to a level of sufficient magnitude to strike the arc 12 and cause a current to flow, the voltage pulse 170 across the arc 12 will fall very rapidly. As the voltage 64 falls at time 172, it reaches a level substantially equal to the potential across the condenser 86. By way of example, this potential may be on the order of approximately 350 to 400 volts. At this time 172, the condenser 86 may commence discharging through the now conductive path formed by the arc 12. This timing of the current flow will inherently be very precisely timed and will be completely automatic as a consequence of having struck the arc. Accordingly, it is not necessary to provide any form of switching means to control or time this discharge.

Although the amount of energy that the condenser 46 dissipates in the gap is negligible, the condenser 86 will have sufficient energy to produce an appreciable current flow. This will cause the voltage 64 to follow a path such as exists between the times 172 and 174. These times 172 and 174 are separated from each other on the order of approximately one to three microseconds or less. During this period 172 to 174, the current and voltage in the arc 12 will cause the arc to move until it is following substantially the shortest path between the two electrodes whereby it will be accurately centered on the end of at least one of the electrodes 14 and 16. In addition to centering the arc 12, the combination of the voltage and current will cause a sufficient "burning" of the material on the end of at least one electrode to clean the surface thereof and remove oxides, scales, etc., and to consume any oxygen that may be present in the atmosphere immediately adjacent to the gap.

As soon as the condenser 46 has discharged and the voltage 64 has dropped to a level substantially equal to the potential across the condenser bank 148, the charge in the condenser bank 148 will flow through the secondary 58 and across the arc 12. This discharge will initially provide a voltage drop across the arc 12 on the order of approximately 20 to 50 volts. As the discharge progresses, the voltage will fall to a level 176 where the arc 12 fails.

It should be noted that the capacitance of the condensers 148 may be carefully determined and that the voltage thereacross may be accurately set by adjusting the position of the center tap 132. As a consequence, the amount of energy stored in the condenser bank 148 may be accurately controlled. Thus, the energy discharged in the arc 12 and absorbed by the electrodes 14 and 16 may be accurately controlled.

It should be noted that as the charge from the bank 148 is dissipated in the arc 12, the voltage thereacross will fall to the level 176 where it is too low to sustain the arc 12. At this point, the arc 12 will become non-conductive and the discharge of the condenser bank 148 will cease. Since the characteristics of the electrodes 14 and 16 and the spacing therebetween will vary slightly from time to time, the voltage at which the arc 12 extinguishes will vary. Normally, this variation in the level 176 will be within narrow limits. As a result, the residual energy remaining on the condenser bank 148 will vary within a correspondingly small range. Although these variations are normally of a small enough order to be within acceptable limits, under some circumstances, for example, where the electrodes 14 and 16 are relatively small and more precise control is necessary, the Zener diode 150 may be provided. The Zener level 178 of this diode 150 is preferably below the potential across the condenser bank 148 and above the potential 176 at which the arc 12 extinguishes. As a result, the Zener diode 150 will insure the arc 12 being extinguished at an accurately controlled potential 178 as indicated by the broken line 180. Thus, the amount of energy dissipated in the arc 12 will be very precisely controlled, and the entire welding operation can be completed within an interval of about 1 to 5 milliseconds.

By adjusting the potentiometer 130, the charge on the condenser bank 148 will be varied. This makes it possible to vary the potential which is provided across the air gap by the condenser bank 148 during the interval that the energy for the weld is being dissipated. This, in turn, will vary the rate at which the energy is dissipated in the arc. By varying the rate of discharge, it will be possible to vary the rate at which the members 14 and 16 are heated so as to cause the members to be heated at a rate compatible with the thermal acceptance or conductivity of the members. For example, with a highly conductive material such as copper or aluminum, the rate of heating may be high and in a poorly conductive material such as stainless steel, the heating rate may be lower. In addition, by varying the rate of discharge, the overall duration of the arc discharge may be varied.

The duration of the discharge is preferably made very short while remaining compatible with the weld material. As may be seen from FIGURE 2, the duration of the entire weld is on the order of only a few milliseconds. This will permit heating a very small amount or volume of metal to the molten state without heat being dissipated over a wide area of the members 14 and 16. This, in turn, will prevent annealing any substantial portion of the members and any internal stress will be localized to the immediate area of the weld. In addition, since the oxygen immediately adjacent the arc is consumed during the initial phases of the discharge, the atmosphere around the molten metal will not be able to become of an oxidizing nature during the short period the metal is molten. It may thus be seen that the capacitance of the bank 148 and the voltage of the charge are selected so as to maintain a balance therebetween that will insure an amount of energy being stored that will produce a heating of the exact magnitude and a rate of heating that is compatible with the welding materials.

Since the duration of the welding arc is only in the order of a few milliseconds, the welding arc is completed during the time that the switch 54 is closed. This causes the capacitances 86 and 148 to become substantially fully discharged before the switch 54 opens so that a new cycle of operation can be initiated as soon as the switch 54 opens. Because of this, members can be welded at a rate approaching the frequency of the source of alternating voltage.

By way of example, in one operative welder embodying the present invention, the various components had approximately the following characteristics. The transformer 26 had a turns ratio such that the voltage from secondary 34 was 2,500 volts, the voltage from secondary 70 was 325 volts, and the voltage from secondary 94 was 100 volts. The resistor 42 had 330 kiloohms, the condenser 46 had 60 microfarads, the condenser 82 had a capacity of 1 microfarad, the resistor 84 had 180 kiloohms, the condenser 86 had 1 microfarad, the Zener diode 88 had a Zener level of 350 volts, the condenser bank 148 was variable up to 1,500 microfarads, and the Zener diode 150 had a Zener level of 400 volts. The transformer 50 may have a core consisting of a high frequency ferrite with a low saturation and low residual magnetism such as a Ferrocube 104 manufactured by the Ferroxcube Co. The winding 48 may comprise 1 turn of #20 wire while the secondary comprises 30 turns of #7 wire.

Although the present invention has been disclosed and described with reference to but one embodiment, it will be readily apparent to persons skilled in the art that numerous changes and modifications may be made thereto without departing from the spirit of the invention. The foregoing drawings and description are for illustrative purposes only and are not to limit the invention which is defined only by the claims that follow.

What is claimed is:

1. A pulse arc welder for producing an electrical arc discharge across an air gap between a pair of workpieces, said welder comprising the combination of:

energy storage means for accumulating an electrical charge of energy containing the amount of energy required to be dissipated in said arc, a first discharge path having a high resonant frequency and including said air gap, a second discharge path coupled directly to said first discharge path and including said air gap for blocking any current flow from said storage means through said second discharge path as long as no arc is struck across that gap, and control means having a first operative relationship effective to prevent the discharge of said charge of energy from said storage means and having a second operative relationship for connecting said first discharge path to said storage means for obtaining a discharge of an initial portion of said charge through said first path to create between said workpieces a high voltage pulse having said high frequency for the production of an initial arc between said workpieces so that the rest of said energy discharges through said second path and such initial arc to form a continuation of said initial arc at a high energy level.

2. In combination for providing an arc weld between first and second members, energy storage means for storing a charge of energy, control means having first and second operative relationships and operatively coupled to the energy storage means and operative in the first relationship to prevent the transfer of energy from the energy storage means and operative in the seond relationship to obtain the transfer of energy from the energy storage means, means operatively coupled to the control means and the energy storage means for producing a pulse of voltage between the first and second members of sufficient amplitude to produce an electrically conductive arc discharge of a low amount of energy from the energy storage means, means responsive to the conductivity of said arc between the first and second members for discharging an intermediate amount of energy into said arc at an intermediate voltage to provide a cleaning of the surfaces of the first and second members, and means responsive to the discharge of the intermediate amount of energy into said arc at the intermediate voltage for obtaining a discharge of a considerable amount of energy at a low voltage to provide a welding of the first and second members.

3. In combination for providing an arc weld between first and second members, capacitive energy storage means operatively coupled to the source of energy to provide a transfer of a particular amount of energy to the energy storage means from the source of energy, control means operatively coupled to the energy storage means and having a first operative relationship to provide for a transfer of energy from the energy storage means and a second operative relationship to prevent the transfer of energy from the energy storage means, inductive reactance means directly coupled to the first and second members and to the energy storage means during said first operative relationship of the control means, said inductive reactance means having a reactance relative to that of the capacitive storage means to obtain the production of a voltage pulse of large amplitude at a high frequency between the first and second members for the production of an arc between the first and second members, and means directly coupled to the energy storage means and the inductive reactance means and responsive to the production of the arc between the first and second members for providing for the discharge of the energy in the energy storage means through the inductive reactance means in a unidirectional pulse at a high energy level to maintain the arc between the first and second members at a level for producing the arc weld between the first and second members.

4. A pulse arc welder for discharging a pulse for energy between a pair of electrode members separated by an air gap, said welder comprising:

energy storage means having a capacity for storing all of the energy required to be dissipated in said arc, a discharge circuit including a first discharge path and a second discharge path, said first discharge path, including a continuously conductive secondary winding connected in series with said electrode members so as to include said air gap, said second discharge path including a primary winding that is inductively coupled to said secondary winding for coupling said first and second paths together and to said electrode members, control means including a switch for momentarily connecting at least a portion of said capacity directly across said primary winding to form a low impedance tank circuit wherein the full voltage of that portion of the charge is initially impressed across primary winding, said primary winding being effective during said momentary connection of the switch to discharge an initial portion of the energy in said capacity therethrough to substantially instantly produce a high frequency, high voltage in said first discharge path for striking an arc across said air gap and causing said air gap to become electrically conductive and discharge the remainder of the stored energy through said secondary winding in said first path and into said arc.

5. A pulse arc welder for producing an electrical arc discharge across an air gap between a pair of workpieces, said welder comprising the combination of:

energy storage means having a capacitance accumulating an electrical charge of energy containing the amount of energy required to be dissipated in said arc, a first discharge path having a primary winding with a high resonant frequency, a second discharge path having a secondary winding connected directly to said air gap, a ferrite core member disposed in said windings for inductively coupling said primary winding to said secondary winding, control means having a first operative relationship effective to prevent the discharge of said charge of energy from said capacitance and having a second operative relationship for connecting at least a portion of the capacitance in said storage means directly to the primary winding to impress the full potential of said portion of the charge directly across the primary winding for obtaining a discharge of an initial portion of said charge through said first path to create between said workpieces a high voltage pulse having said high frequency for the production of an initial arc between said workpieces and for obtaining a discharge of the rest of said energy through said second path to form a continuation of said initial arc at a high energy level.

6. A pulse arc welder for producing an electrical arc discharge across an air gap between a pair of workpieces, said welder comprising the combination of:

energy storage means for accumulating an electrical charge of energy containing the amount of energy required to be dissipated in said arc;

a first discharge path directly coupling said energy storage means to one of said workpieces so as to include said air gap in said first discharge path, said gap preventing said storage means to discharge through said first discharge path as long as no arc is struck across said gap;

a second discharge path having a high resonant frequency at a high Q and being inductively coupled to said first discharge path and said air gap; and control means having a first operative relationship effective to prevent the discharge of said charge of energy from said storage means and having a second operative relationship for connecting said second discharge path to said storage means for obtaining a discharge of an initial portion of said charge through said second path to create between said workpieces a high voltage pulse having said high frequency for the production of an initial arc between said workpieces so that a second portion of said energy discharges through said first path to form a continuation of said initial arc at a high energy level.

7. A pulse arc welder for discharging a pulse of energy across an air gap, said welder comprising:

a pair of electrically conductive electrode members for discharging energy therebetween, and being positioned in a space relation with said air gap extending therebetween;

energy storage means having a capacity for storing all of the energy required to be dissipated in said arc;

a transformer having a primary winding and a secondary winding at a high step-up ratio, said secondary winding being connected in series with said storage means and said electrode members and defining therewith a discharge circuit having a large resistance when said air gap is electrically non-conductive and a low resistance when said air gap is electrically conductive due to an arc, the voltage in said discharge circuit being too low to strike an arc across said air gap as long as no voltage is applied to said primary winding;

controllable circuit means having a first operative relationship with said primary winding to complete a resonant circuit therewith so as to produce a high voltage at a high frequency in said secondary winding sufficient for striking an arc across said gap and causing said air gap to become electrically conductive for the discharge of the energy stored in said storage means into said arc, said circuit means having a second operative relationship in which said resonant circuit is prevented for resonating.

8. A pulse arc welder for discharging a pulse of energy between a pair of electrode members separated by an air gap, said welder comprising:

energy storage means having a capacity for storing all of the energy required to be dissipated in said arc;

a discharge circuit coupled to said electrode members and including a first discharge path and a second discharge path directly coupled to each other, by means of a variable impedance means, said first path having a large resistance when said gap is electrically non-conductive and a low resistance when said arc is electrically conductive, said impedance means being responsive to the flow of current therethrough to decrease its impedance as the current increases; and control means including a switch for momentarily connecting said second discharge path to said energy storage means for discharging a first portion of the energy stored therein through said second discharge path thereby causing said impedance means to produce a high frequency, high voltage in said first discharge path and striking an arc across said gap thereby causing said air gap to become electrically conductive for the discharge of a second portion of the energy in said charge through said first path and into said arc at a low impedance of said variable impedance means.

9. In combination for providing an arc weld between first and second members;

an electrical energy source;

electrical energy storage means;

means coupled to the energy source and to the energy storage means for introducing a predetermined amount of electrical energy from the energy source to the energy storage means;

a normally disabled high frequency circuit means including an impedance means, said circuit means when enabled developing a high frequency-high voltage across said impedance means for a limited period of time;

circuit means including said impedance means for connecting said storage means to said electrodes to define a series circuit path with said storage means and said air gap, said gap inhibiting current flow through said path as long as no arc is struck between said electrodes, while a high voltage across said impedance strikes an arc across said air gap thereby effectively lowering the impedance of said circuit path and causing at least substantial discharge of the energy stored in said storage means into said arc; and control means for normally maintaining said high frequency circuit means disabled while permitting temporary enabling thereof.

10. A pulse arc welder for producing an electrical arc discharge across an air gap between a pair of workpieces, said welder comprising the combination of:

energy storage means for accumulating a particular amount of energy required to be dissipated in an arc across the air gap;

circuit means connecting said storage means to said electrodes and defining therewith a series circuit path extending between said storage means and the air gap via said circuit means, so as to maintain a voltage across said air gap insufficient to strike an arc while the high impedance of said air gap when unionized prevents discharge of said storage means;

normally disabled high frequency circuit means including said circuit means which when enabled develops a high frequency-high voltage serially effective in said circuit path across said air gap to strike an arc thereby effectively lowering the impedance of said series circuit path so that said storage means discharges through the arc across said air gap; and control means for selectively enabling and disabling said high frequency circuit means.

11. A pulse arc welder for producing an electrical arc discharge across an air gap between a pair of workpieces, said welder comprising the combination of:

energy storage means for accumulating a particular amount of energy required to be dissipated in an arc across the air gap;

a high frequency signal producing circuit;

control means having a first and a second operative relationship, to respectively enable and disable said circuit by respectively connecting it to and disconnecting it from said storage means;

signal means including said high frequency circuit and being connected in series with said electrode to apply a high frequency-high voltage to said electrodes when said control means is in said first operative relationship so that an initial arc be struck across said air gap; and circuit means for connecting said storage means to said electrodes via said signal means thereby defining a discharge path permitting current flow only when an initial arc has been struck across said electrodes.

12. A pulse arc welder as set forth in claim 1 and comprising:

means responsive to the discharge of energy from said storage means and effective to terminate said discharge when a predetermined amount of energy has been discharged.

13. A pulse arc welder for producing an electrical arc discharge across an air gap between a pair of workpieces, the welder comprising:

storage means for accumulating a predetermined amount of electrical energy at a voltage insufficient to strike an arc across said gap;

a discharge circuit including said gap and having first and second discharge paths, and coupling means connected in series with said air gap and included in said second discharge path to couple said first discharge path to said air gap, said first discharge path including high frequency oscillating means which include said coupling means to develop high frequency, high voltage signals in said second discharge path across said air gap; and single control means establishing a first operative relationship between said discharge circuit and said storage means to prevent development of high frequency, high voltage pulses in said coupling means thereby preventing said storage means from discharging through either one of said discharge paths, and establishing in the alternative, a second operative relationship between said storage means and said discharge circuit so that said oscillating means develop a high frequency, high voltage in said coupling means to strike an initial arc across said air gap so that said storage means can discharge a predetermined quantity of energy through said second discharge path and into said arc when struck.

References Cited by the Examiner

UNITED STATES PATENTS

| | | | |
|---|---|---|---|
| 1,721,348 | 7/1929 | Mawdsley | 219—135 X |
| 2,235,385 | 3/1941 | Rava | 219—113 X |
| 2,488,899 | 11/1949 | Cooper et al. | 219—100 X |
| 2,508,103 | 5/1950 | Dawson | 219—113 |
| 2,876,386 | 3/1959 | Fefer et al. | 219—69 X |
| 3,014,155 | 12/1961 | Inoue | 219—113 X |
| 3,052,817 | 9/1962 | Branker | 219—69 X |
| 3,136,880 | 6/1964 | Glorioso | 219—98 |

RICHARD M. WOOD, *Primary Examiner.*

MAX L. LEVY, *Examiner.*

R. F. STAUBLY, *Assistant Examiner.*